United States Patent [19]

Mandel et al.

[11] 3,995,719

[45] Dec. 7, 1976

[54] ELEVATOR SYSTEM

[75] Inventors: Alan F. Mandel, Pittsburgh; Leonard C. Vercellotti, Verona, both of Pa.

[73] Assignee: Westinghouse Electric Corporation, Pittsburgh, Pa.

[22] Filed: May 16, 1975

[21] Appl. No.: 578,304

[52] U.S. Cl. .......................... 187/29 R; 340/19 R
[51] Int. Cl.$^2$ ........................................ B66B 3/02
[58] Field of Search .................. 187/29; 340/19, 21

[56] References Cited

UNITED STATES PATENTS

| | | | |
|---|---|---|---|
| 3,493,922 | 2/1970 | Laas | 340/19 |
| 3,841,443 | 10/1974 | Booker, Jr. | 187/29 |
| 3,882,447 | 5/1975 | Booker, Jr. | 340/21 |
| 3,903,499 | 9/1975 | Oliver | 340/19 |

Primary Examiner—Robert K. Schaefer
Assistant Examiner—W. E. Duncanson, Jr.
Attorney, Agent, or Firm—D. R. Lackey

[57] ABSTRACT

An elevator system including an elevator car mounted for movement in a building to serve the floors therein, and a car position indicator for indicating the position of the elevator car relative to the floors. A universal binary advanced car position signal is the input for a read-only memory programmed to output signals which drive the display portion of the position indicator to provide the notations desired for the specific building configuration. The power supply for the car position indicator intermittently activates the read-only memory to reduce the average power consumption thereof.

17 Claims, 6 Drawing Figures

| PROM INPUT | | | | PROM OUTPUT | | | | DECODER INPUT | | | | DISPLAY |
|---|---|---|---|---|---|---|---|---|---|---|---|---|
| AVP4 | | | AVP0 | LEFT DIGIT | | | | RIGHT DIGIT | | | | |
| 0 | 1 | 1 | 1 | 1 | 1 | 0 | 0 | 1 | 0 | 1 | 1 | |
| 0 | 1 | 1 | 0 | 0 | 0 | 0 | 1 | 0 | 1 | 0 | 0 | |
| 0 | 1 | 1 | 0 | 0 | 0 | 0 | 1 | 0 | 0 | 1 | 1 | |
| 0 | 1 | 1 | 0 | 0 | 0 | 0 | 1 | 0 | 0 | 1 | 0 | |
| 0 | 1 | 0 | 1 | 1 | 0 | 0 | 0 | 1 | 0 | 0 | 0 | 1 | | |
| 0 | 1 | 0 | 1 | 0 | 0 | 0 | 0 | 1 | 0 | 0 | 0 | 0 | | |
| 0 | 1 | 0 | 0 | 1 | 1 | 1 | 1 | 1 | 1 | 0 | 0 | 1 | | |
| 0 | 1 | 0 | 0 | 0 | 1 | 1 | 1 | 1 | 1 | 0 | 0 | 0 | | |
| 0 | 0 | 1 | 1 | 1 | 1 | 1 | 1 | 1 | 0 | 1 | 1 | 1 | | |
| 0 | 0 | 1 | 1 | 0 | 1 | 1 | 1 | 1 | 0 | 1 | 1 | 0 | | |
| 0 | 0 | 1 | 0 | 1 | 1 | 1 | 1 | 1 | 0 | 1 | 0 | 1 | | |
| 0 | 0 | 1 | 0 | 0 | 1 | 1 | 1 | 1 | 0 | 1 | 0 | 0 | | |
| 0 | 0 | 0 | 1 | 1 | 1 | 1 | 1 | 1 | 0 | 0 | 1 | 1 | | |
| 0 | 0 | 0 | 1 | 0 | 1 | 1 | 1 | 1 | 0 | 0 | 1 | 0 | | |
| 0 | 0 | 0 | 0 | 1 | 1 | 1 | 1 | 1 | 0 | 0 | 0 | 1 | | |
| 0 | 0 | 0 | 0 | 0 | 1 | 1 | 1 | 1 | 1 | 0 | 1 | 0 | | |

FIG. 4

| PROM INPUT | | | | PROM OUTPUT | | | | DECODER INPUT | | | | DISPLAY |
|---|---|---|---|---|---|---|---|---|---|---|---|---|
| AVP4 | | | AVP0 | LEFT DIGIT | | | | RIGHT DIGIT | | | | |
| 0 | 1 | 1 | 1 | 0 | 0 | 0 | 1 | 0 | 1 | 1 | 1 | |
| 0 | 1 | 1 | 0 | 0 | 0 | 0 | 1 | 0 | 1 | 1 | 0 | |
| 0 | 1 | 0 | 1 | 0 | 0 | 0 | 1 | 0 | 1 | 0 | 1 | |
| 0 | 1 | 0 | 0 | 0 | 0 | 0 | 1 | 0 | 1 | 0 | 0 | |
| 0 | 1 | 0 | 1 | 1 | 0 | 0 | 0 | 1 | 0 | 0 | 1 | 0 | | |
| 0 | 1 | 0 | 1 | 0 | 0 | 0 | 0 | 1 | 0 | 0 | 0 | 1 | | |
| 0 | 1 | 0 | 0 | 1 | 0 | 0 | 0 | 1 | 0 | 0 | 0 | 0 | | |
| 0 | 1 | 0 | 0 | 0 | 1 | 1 | 1 | 1 | 1 | 0 | 0 | 1 | | |
| 0 | 0 | 1 | 1 | 1 | 1 | 1 | 1 | 1 | 1 | 0 | 0 | 0 | | |
| 0 | 0 | 1 | 1 | 0 | 1 | 1 | 1 | 1 | 0 | 1 | 1 | 1 | | |
| 0 | 0 | 1 | 0 | 1 | 1 | 1 | 1 | 1 | 0 | 1 | 1 | 0 | | |
| 0 | 0 | 1 | 0 | 0 | 1 | 1 | 1 | 1 | 0 | 1 | 0 | 1 | | |
| 0 | 0 | 0 | 1 | 1 | 1 | 1 | 1 | 1 | 0 | 1 | 0 | 0 | | |
| 0 | 0 | 0 | 1 | 0 | 1 | 1 | 1 | 1 | 0 | 0 | 1 | 1 | | |
| 0 | 0 | 0 | 0 | 1 | 1 | 1 | 1 | 1 | 0 | 0 | 1 | 0 | | |
| 0 | 0 | 0 | 0 | 0 | 1 | 1 | 1 | 1 | 0 | 0 | 0 | 1 | | |

ELEVATOR SYSTEM

BACKGROUND OF THE INVENTION

1. Field of the Invention:

The invention relates in general to elevator systems, and more specifically to new and improved car position indicators for elevator systems.

2. Description of the Prior Art:

Elevator systems conventionally provide a car position indicator in each elevator car, to indicate to the passengers the position of the elevator car relative to the floors, and a car position indicator may also be disposed external to the car at a selected floor, or floors, such as at the main floor. The car position displayed on the position indicator is normally the advanced floor position of the car, i.e., the actual floor position of a stationary car, and the closest floor to the car at which the elevator car can make a normal stop, for a moving car.

With an electromechanical floor selector, the car position indicator is driven by contacts actuated as the floor selector is driven in synchronism with the movement of the elevator car. U.S. Pat. No. 2,085,135 is an example of this type of position indicator. With a solid state floor selector, the advanced floor position may be developed by generating pulses responsive to car movement which are summed to provide a continuous car position, and this signal may be used to provide index pulses for an up-down counter which provides a car position signal related to a floor. U. S. Pat. No. 3,750,850 is an example of a floor selector which generates the advanced car position in this manner, and copending application Ser. No. 358,429, filed May 8, 1973, which is assigned to the same assignee as the present application, discloses a car position indicator which utilizes a signal such as provided by an up-down counter to energize a different lamp for each floor, in order to indicate car position.

Car position indicators which utilize a different incandescent lamp for each floor require a substantial amount of time to wire in the field, because the number of wires which must be connected to the car position indicator fixture is quite large, and the wiring is not standardized. In other words, each elevator installation may have a different number of wires, and the display fixture portion of the car position indicator may be a different size for each installation having a different number of floors. Also, the constant cycling of the incandescent lamps causes early failure thereof, which increases maintenance costs.

A rotatable disc with numbered slides disposed on its periphery, a single lamp, and a display screen for showing a slide image, has been used to reduce the number of wires and the number of incandescent lamps, but this type of car position indicator is limited to elevators which have a maximum speed of 300–350 feet per minute (90–100meters per minute). With speeds faster than this, the display blinks on and off so rapidly that it is difficult to read. This type of display is also subject to mechanical problems, such as getting out of synchronism with the elevator car, focus problems, and early failure of the lamp due to the constant cycling thereof.

Separate fixed slides with separate low voltage lamps and associated display screens have been used for higher speed elevator cars, but the field wiring is not standardized, the lamp replacement is difficult, it requires a step-down transformer, and it is subject to focus and contrast problems. The relatively poor contrast usually dictates that instead of using a single car position display mounted over the door of the elevator car, two displays be used, one mounted on each side of the door above the main and auxiliary car call pushbutton stations.

Thus, it would be desirable to improve the car position indicator for elevator systems by reducing the number of wires which are required to be connected to the position indicator in the field, by standardizing the display fixture size and wiring thereof so the same external connections are made for each installation, regardless of the number of floors and the desired display notations for each floor, and by using display elements which have a long service life, notwithstanding on-off cycling.

SUMMARY OF THE INVENTION

Briefly, the present invention is a new and improved elevator system having a car position indicator which may utilize a solid state display. The solid state displays, in general, have a very long operating life, even when continuously cycled, and certain of the liquid crystal displays, such as the field effect liquid crystal, require very little power, they have high contrast and wide viewing angle, they have a low initial cost, and they are directly compatible with COS/MOS logic, both in voltage rating and power density. Since the power supply is usually the major cost factor with solid state equipment, it is important to keep the power requirement to an absolute minimum, in order to simplify the power supply.

Field wiring is minimized and standardized by utilizing a binary advanced car position signal and a programmable read-only memory. The read-only memory is custom programmed at the factory for each installation to provide signals indicative of the desired display notation for each binary advanced car position signal applied as an input to the read-only memory.

The normally relatively large power required by the read-only memory is made compatible with the low power requirements of liquid crystal displays and COS/MOS logic, permitting a low cost Zener diode and resistor power supply from the +125v. direct current voltage available in the elevator car, by intermittently operating the read-only memory to reduce the average power consumed thereby and to thus reduce the power dissipated in the resistor of a Zener diode type power supply to a reasonable value.

BRIEF DESCRIPTION OF THE DRAWINGS

The invention may be better understood, and further advantages and uses thereof more readily apparent, when considered in view of the following detailed description of exemplary embodiments, taken with the accompanying drawings in which.

DESCRIPTION OF PREFERRED EMBODIMENTS

Figure 1:
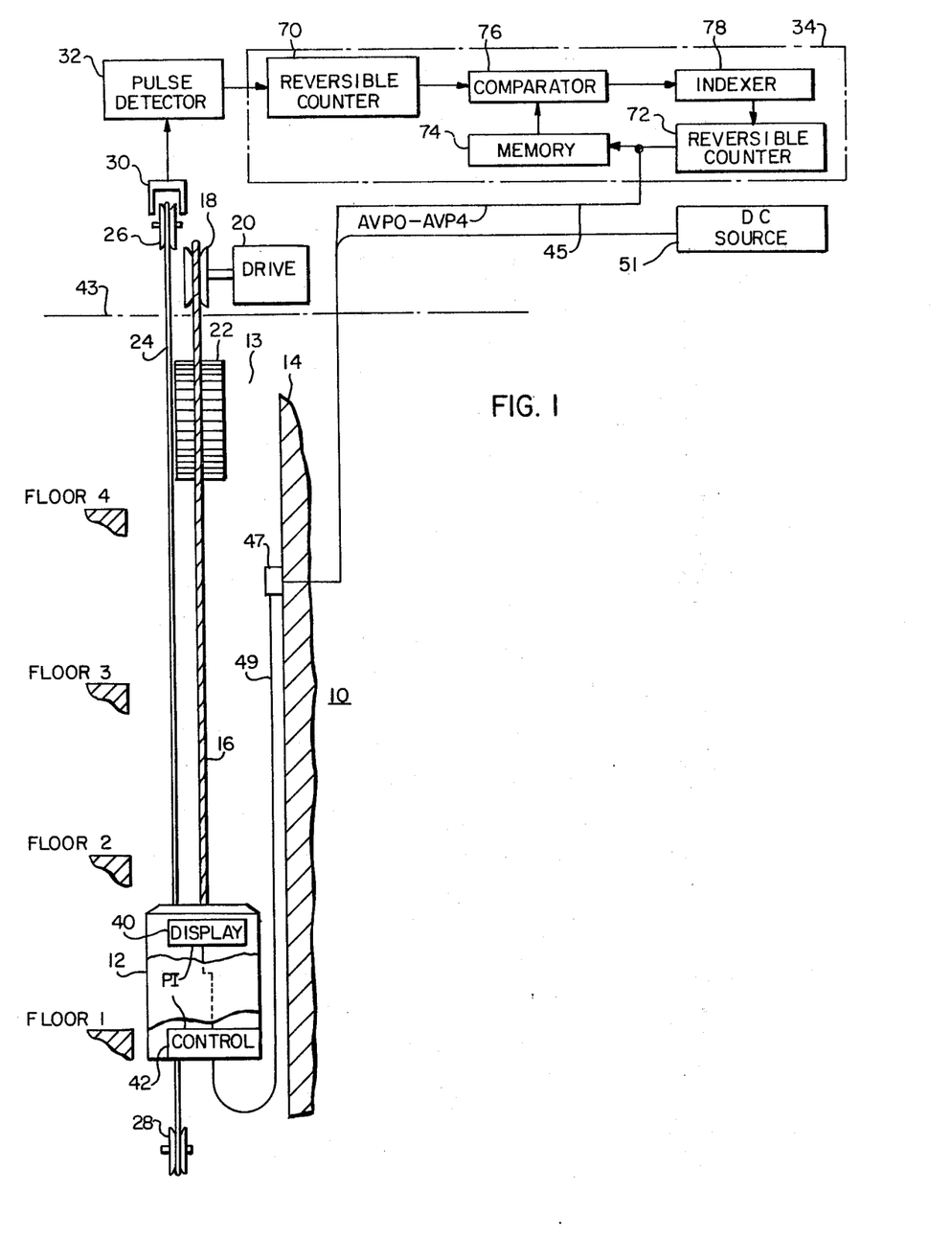
FIG. 1 is a partially schematic and partially block diagram illustrating an elevator system which may utilize the teachings of the invention.

Referring now to the drawings, and FIG. 1 in particular, there is shown an elevator system 10 which may utilize the teachings of the invention. Elevator system 10 includes an elevator car 12 mounted in the hoistway 13 for movement relative to a structure 14 having a plurality of floors or landings, such as 16, with only a few of the floors being illustrated in order to simplify the drawing. The car 12 is supported by a rope 16 which is reeved over a traction sheave 18 mounted on the shaft of a drive motor 20, such as a direct current motor as used in the Ward-Leonard drive system. A counterweight 22 is connected to the other end of the rope 16.

The elevator system 10 includes a car position indicator PI mounted in the elevator car 12, which includes a display 40 and associated control 42. It is desired to standardize the field wiring of the car position indicator PI, regardless of the number of floors and the specific notations to be displayed on the car position indicator for each floor. The first step in accomplishing this result, according to the teachings of the invention, represents the advanced floor position of the elevator car with a binary signal. For a 16 floor building, the advanced floor position of the car may be represented by a 4 bit word, a 32 floor building requires only a 5 bit word, etc. Thus, only a few wires are required to be connected to the position indicator in order to provide an indication of the advanced floor position of the car, and the same wires would be connected to the same input terminals of the car position indicator for each installation.

If the car control is of the electromechanical relay type, a binary representation of the advanced floor position of the elevator car may be generated via a diode circuit board. If the car control is of the solid state type, a binary representation of the advanced floor position may already be available. For example, U.S. Pat. No. 3,750,850, which is assigned to the same assignee as the present application, discloses a solid state floor selector which generates the advanced floor position as binary signal AVPO-AVP4, and it will be assumed, for purposes of example, that this solid state floor selector is providing the advanced floor position signal for the car position indicator of the present invention.

Accordingly, using the same reference numerals in FIG. 1 which are used in U.S. Pat. No. 3,750,850 for indicating like components, the binary advanced floor position signal AVPO-AVP4 may be generated in a floor selector 34 via pulses generated in a pickup 30 responsive to openings disposed about the periphery of a governor sheave 26. More specifically, a governor rope 24, which is connected to the top and bottom of the elevator car 12, is reeved over the governor sheave 26 located above the highest point of travel of the elevator car in the hoistway 13, and over a pulley 28 located at the bottom of the hoistway. Pickup 30 is disposed to detect movement of the elevator car 12 through the effect of circumferentially spaced openings in the governor sheave 26. The openings in the governor sheave are spaced to provide a pulse for each standard increment of travel of the elevator car, such as a pulse for each 0.5 inch (1.27 cm.) of car travel. Pickup 30, which may be of any suitable type, such as optical or magnetic, provides pulses in response to the movement of the openings in the governor sheave. Pickup 30 is connected to a pulse detector 32 which provides distance pulses for floor selector 34. Distance pulses may also be developed in any other suitable manner, such as by a pickup disposed on the elevator car which cooperates with regularly spaced indicia in the hoistway.

The floor selector 34 processes the distance pulses from the pulse detector 32 to develop information concerning the position of the car 12 in the hoistway 13. The floor selector 34 includes a reversible counter 70 which starts with a predetermined count at the lowest or first floor, counts up when the car is traveling upwardly, and counts down when the car is traveling downwardly. Counter 70 is a binary counter having the number of bits necessary to count to the binary number determined by the standard increment, and the height between the lowest and uppermost floors.

Counter 70 is arranged to output a binary number which continuously changes as the car moves relative to the structure, to continuously indicate the advanced car position, as opposed to the actual position of the car in the hoistway. This continuous advanced car position is the point at which the elevator car could be brought to a stop from its current velocity under a predetermined deceleration schedule. As disclosed in U.S. Pat. No. 3,589,474, which is assigned to the same assignee as the present application, the continuous advanced car position may be generated directly in the reversible counter 70 by generating pulses at twice the rate of the distance pulses when the car is accelerating, and at the same rate as the distance pulses when the car is traveling at constant speed. When deceleration is initiated, the counting of the distance pulses is discontinued such that when the elevator car comes to a stop, the count in the counter reflects the actual car position.

A second reversible counter 72 provides a signal which indicates the discrete advanced car position in terms of floor number. The second reversible counter 72 is also a binary counter, having the number of bits necessary to provide a binary word for the uppermost floor. Counter 72 is indexed up or down, as required, as the count of the continuous advanced car position changes.

A read-only memory 74 is provided, which, when addressed by the binary word of counter 72, which represents the discrete advanced floor position of the car, outputs a binary word having the number of bits necessary to describe the exact location of that floor relative to the structure, with a resolution of the same standard increment used to generate the distance pulses. For example, a 5 bit binary input word describing a floor number may output a 16 bit binary word describing the exact location of that floor in the structure.

A bit-by-bit comparator 76 is provided which compares the binary output words of counter 70 and memory 74. When the binary words of counter 70 and memory 74 are equal, comparator 76 outputs an equality signal. The equality signal indicates slowdown must be initiated at this time or the car cannot stop at the discrete advanced car position. If deceleration is not initiated at that point, comparator 76 provides a signal for indexer 78. Indexer 78 provides a signal for counter 72 which increments or decrements the counter 72 to output the binary word for the next floor in the travel direction. It is this binary word of counter 72 which is referred to as signal AVPO-AVP4, and it is connected to the control 42 in the elevator car 12. Since the floor selector 34 is located remote from the elevator car 12, such as in the penthouse, indicated as being above broken line 43 in FIG. 1, the five wires of signal AVPO-AVP4, indicated generally by conductor 45, are connected to a junction box 47 located at the midpoint of the building 14, and the wires entering junction box 47 are connected to the elevator car 12 via a traveling cable 49.

In addition to control signals, a source 51 of direct current potential, such as +125 volts D.C., located in the penthouse, is connected to the elevator car 12 via the traveling cable 49, for operating the safety relays. An alternating current source (not shown) in the penthouse is also connected to the elevator car for lighting and fan loads in the car.

While the use of a binary advanced floor position signal standardizes field wiring of the car position indicator, some means must be provided to display the desired notations relative to each floor for each specific building. For example, the lowest floor, corresponding to the binary input signal AVPO-AVP4 being 5 zeroes, may require the display to indicate the number 1 in a certain building, and the letter L for lobby in another building. The uppermost floor, indicated by the binary word 01111 for a building having sixteen floors, may require the lettered notation PH for "penthouse" in one building, and the numbered notation 16, or the numbered notation 17 for buildings which skip the number 13, in other buildings. As will be described in detail when describing FIG. 2, this aspect of the invention is accomplished without requiring any additional field wiring by using a programmable read-only memory, which is custom programmed prior to shipment of the car position indicator to the installation site, with the programming of the memory providing two 4-bit BCD (binary coded decimal) words indicative of the desired display notation for each binary floor position indicated by the advanced car position signal AVPO-AVP4. The two 4-bit BCD words may be decoded in standard decoders to drive segmented displays.

The display 42 is a solid state display, selected for its long operating life. While the invention is not limited to any specific type of solid state display, the display is preferably a field effect liquid crystal, such as disclosed in U.S. Pat. No. 3,792,915. The field effect liquid crystal may be constructed to operate in the reflective, transmissive, or transflective modes. The latter two modes require backlighting, but the transflective mode provides a visible change in contrast without backlighting, and thus failure of the backlighting source does not render the display inoperative. The field effect liquid crystal is preferred because of its very low power requirements, high contrast, wide viewing angle, low cost, and direct compatibility with COS/MOS logic, i.e., the same voltage and power density requirements. Using COS/MOS logic and a field effect liquid crystal display, the total current required for the car position indicator, not counting the programmable read-only memory, is only about 2 milliamperes. This very low current requirement enables a low cost Zener diode/resistor type of power supply to be connected to the +125 volt D.C. supply which is available in the elevator car.

A programmable read-only memory, however, which solves the universality problem for display notations, requires a well regulated +5 volt D.C. supply voltage, with a maximum current of about 100 milliamperes. This high current requirement appears to rule out the use of a simple, low cost Zener diode/resistor power supply, as the resistor of the power supply would have to dissipate approximately 12.5 watts (125 volts × .1 ampere). Since the power rating of the resistor is selected by multiplying the actual power to be dissipated by 4, a 50 watt resistor would have to be used, creating space as well overheating problems in the elevator car. Buildings with more than 32 floors would require another read-only memory, as would the use of 16 segment alphanumeric displays (instead of 7 segment displays), with a 50 watt resistor being required for each additional read-only memory.

Elevator codes generally prohibit using the AC lighting circuit for control purposes. Therefore, to provide the desired power with an alternating current source requires an additional AC circuit through the traveling cable, a 120 to 8 volt step-down transformer, rectifiers, and a 5 volt regulator I.C., which is a costly solution.

The present invention solves the power supply problem, without eliminating the read-only memory, by intermittently activating the programmable read-only memory. The read-only memory is pulsed long enough to obtain an output reading corresponding to the latest advanced car position input signal, and this output signal of the read-only memory is stored and used to drive the display until the read-only memory is again pulsed by the power supply. In the specific embodiment of the invention disclosed in FIG. 2, voltage is applied to the read-only memory for 60 microseconds out of every 3.84 milliseconds, a ratio of 1 to 64, but other suitable ratios of on to off time may be used. With the ratio used to illustrate the invention, the average current used by the read-only memory is only 1.56 milliamperes (100 ÷ 64). Thus, a simple Zener diode/resistor power supply may be connected to the available +125 volt source in the elevator car, with very little power dissipation in the resistor.

Figure 2A:
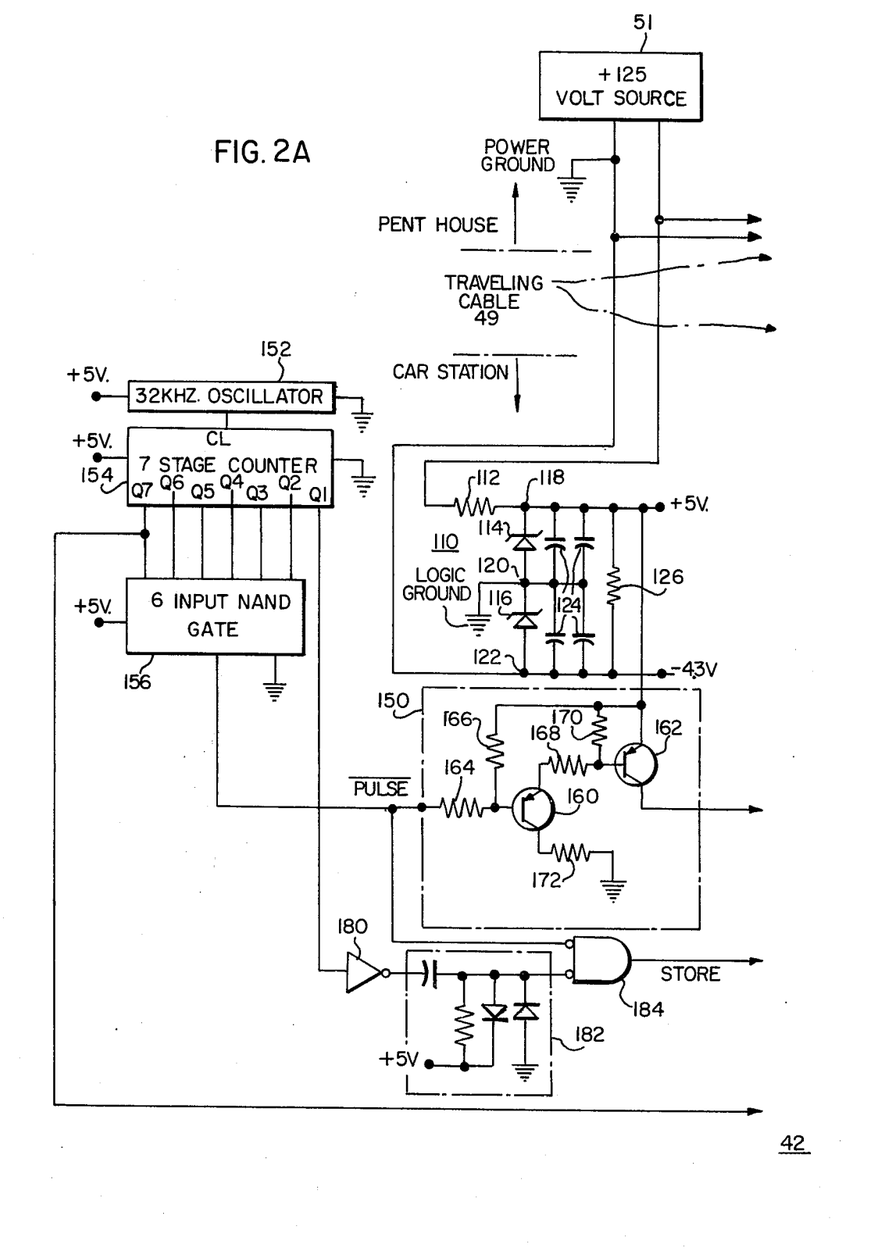
FIGS. 2A + 2B are schematic diagram of an elevator system and car position indicator constructed according to the teachings of the invention.
Figure 2B:
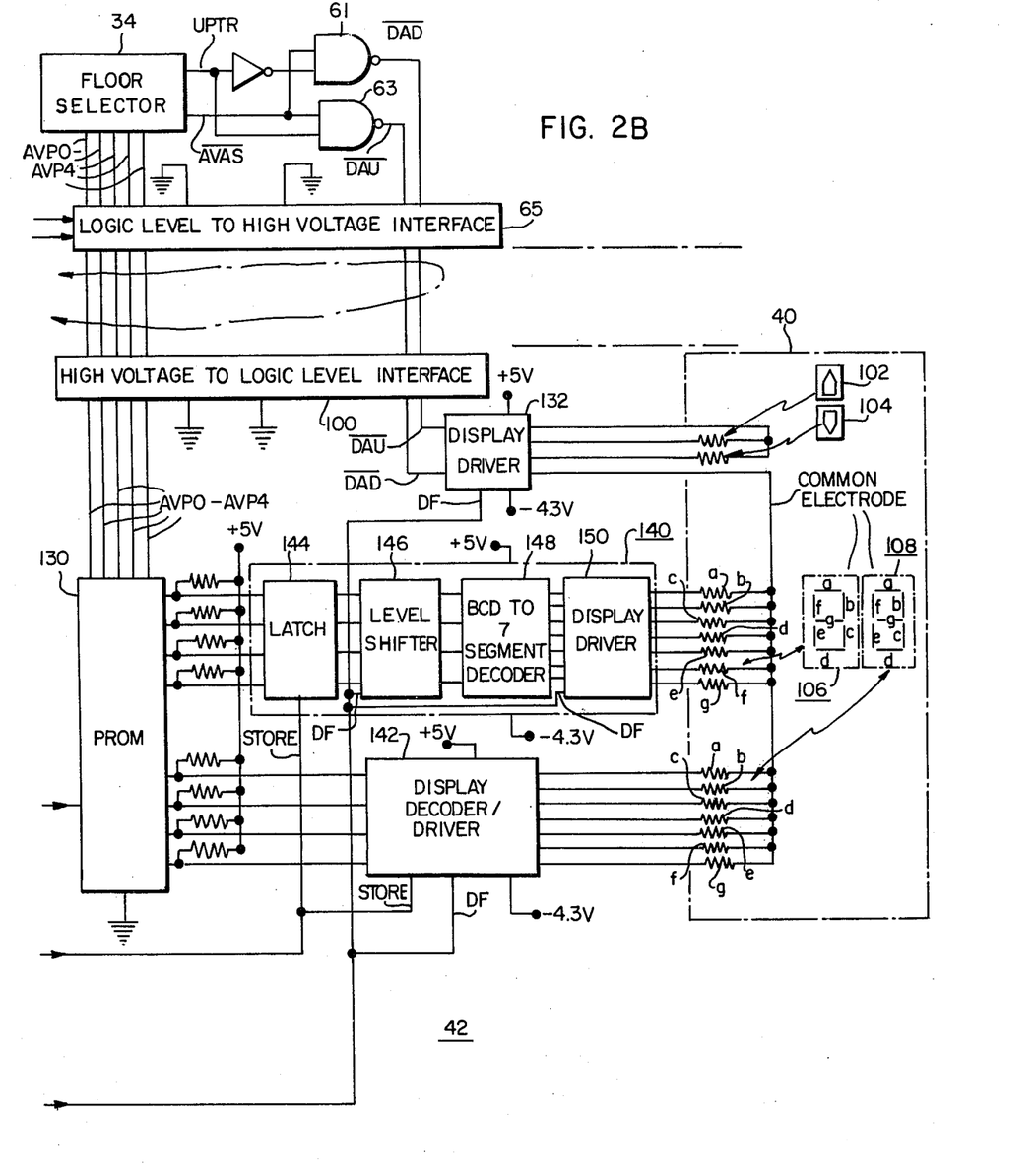

FIGS. 2A and 2B may be assembled to provide a schematic diagram of an elevator system having a car position indicator constructed according to the teachings of the invention. In addition to the floor selector 34 providing the advanced car position signal AVPO-AVP4, it provides signals UPTR and $\overline{AVAS}$. Signal UPTR is a logic one when the associated elevator car is set for up travel, and a logic zero when the elevator car is set for down travel. Signal $\overline{AVAS}$ is a logic zero when the car has no calls, and a logic one when the car is busy. These signals are combined in NAND gates 61 and 63 to provide signals $\overline{DAD}$ and $\overline{DAU}$. Signal $\overline{DAD}$ is a logic zero when the car is busy and set for down travel, and signal $\overline{DAU}$ is a logic zero when the car is busy and set for up travel. These signals are sent to the elevator car over the traveling cable 49 to operate the travel direction arrows of the car position indicator.

Signals AVPO-AVP4 and $\overline{DAD}$ and $\overline{DAU}$ are at the logic level in the penthouse, and they are changed to a power or higher voltage level in the logic level to high voltage interface 65 for transmission to the elevator car 12. These signals are converted back to the logic level in a high voltage to logic level interface 100 located in the elevator car 12.

The display 40, in the example of FIGS. 2A and 2B includes an up direction arrow 102, a down direction arrow 104, a left digit 106 and a right digit 108. The left and right digits are 7-segment display characters, with the 7 segments being referenced $a$ through $g$. As hereinbefore stated, the display 40 is preferably of the field effect liquid crystal type, but other solid state displays may be used, such as dynamic scattering liquid crystal displays, and electrophoretic displays.

The power supply for the car position indicator is a Zener diode/resistor power supply 110, with this low cost power supply being made practical by the teachings of the invention. Power supply 110 is connected to the +125 volt unidirectional source of potential which is already available in the elevator car. Power supply 110 provides voltages above and below logic ground for use by COS/MOS liquid crystal display decoder/driver circuits, by serially connecting a resistor 112 and first and second Zener diodes 114 and 116, respectively, from the high voltage side of the +125 volt source to the side which is connected to power ground. The cathode of Zener diode 114 is connected to resistor 112 at junction 118, and this junction provides a +5 volt unidirectional voltage source. The cathode of Zener diode 116 is connected to the anode of Zener diode 114 at junction 120, and this junction is connected to logic ground. The anode of Zener diode 116 is connected to the power ground at junction 122, and this junction provides a −4.3 volt unidirectional source. Suitable capacitors 124 are connected across the Zener diodes to prevent voltage spikes, and a bleeder resistor 126 is connected between junctions 118 and 122.

The advanced car position binary signal AVPO-AVP4 is connected to the input of a programmable read-only memory 130, and the travel direction signals DAU and DAD are connected to a display driver 132. These seven signal wires are the only signal wires which require field connection for buildings up to 32 floors, and they will be connected to the same input terminals on the car position indicator on every installation, which greatly simplifies the installation of the car position indicator.

Figure 3:
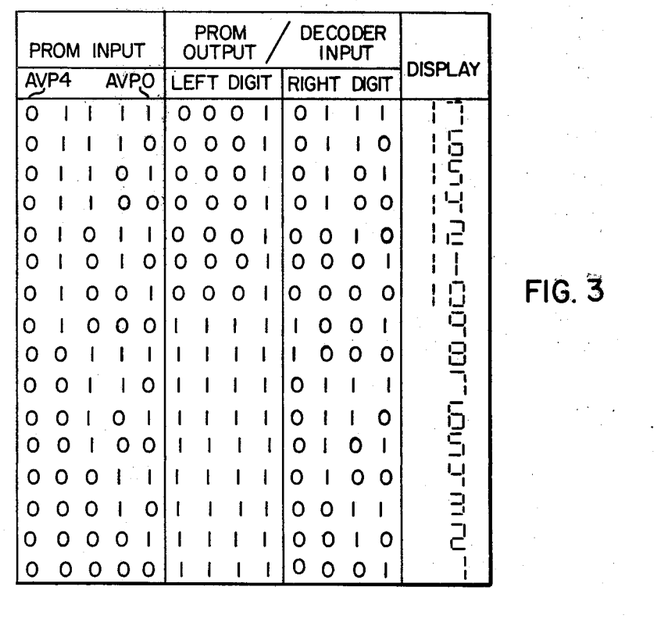
FIGS. 3 and 4 are charts which illustrate the programming of a read-only memory used in the car position indicator shown in FIG. 2, for two different buildings.

The read-only memory 130, which may be Intersil's IM5600, is custom programmed before the car position indicator is shipped to the field, to provide the desired display notation for the left and right digits 106 and 108, respectively, of the display 40. A first example of programming for the read-only memory 130 is illustrated in FIG. 3, for a building having 16 floors, which are numbered 1 to 17, skipping the number 13. When the advanced car position is at the lowest floor, the input signal AVPO-AVP4 will be 00000, and this input is programmed to provide the two 4-bit BCD words which will subsequently be decoded to provide a blank for the left digit and the number 1 for the right digit. The input code to a 7-segment decoder for a blank is 1111, and the input code for the number 1 is 0001. Thus, when the read-only memory is addressed with the binary word 00000, the output words will be 1111 and 0001, as illustrated in FIG. 3.

Figure 4:
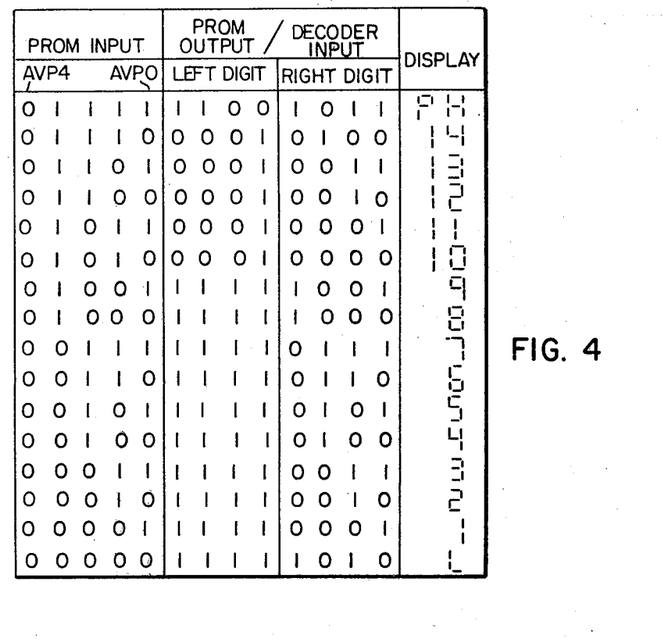

FIG. 4 illustrates a second example of programming for the read-only memory 130, for a building having 16 floors, with the desired lowest floor notation being the letter L, the desired highest floor notation being the letters PH, and with numbers representing the remaining floors. In this instance, when the read-only memory is addressed with the binary word 00000, the output word for the left digit will be 1111, which is decoded to provide a blank, and the output word for the right digit will be 1010, which is decoded to provide the letter L.

As hereinbefore stated, the travel direction signals DAU and DAD are connected to a display driver 132. Display driver 132 is preferably a COS/MOS display driver for a liquid crystal display, such as RCA's CD4054A. In addition to driving a selected one of the displays 102 and 104, it provides a common electrode for the right and left digits of the display 40.

The output words of the read-only memory 130 which control the left and right digits of the display are connected to decoder/driver circuits 140 and 142, respectively. The decoder/driver circuits, which also include a strobed latch function, are preferably COS/MOS devices for driving liquid crystal displays, such as RCA's CD4056A. Since the decoder/driver circuits 140 and 142 are similar, only circuit 140 is shown in functional detail.

Decoder/driver circuit 140 includes a latch function 144, a level shifter function 146, a BCD to 7-segment decoder function 148, and a display driver function 150. The latch 144 stores the BCD word which is output from the read-only memory 130 when the strobe signal STORE applied to its latch line momentarily goes high. The generation of the strobe signal STORE will be hereinafter described. The BCD word which is stored in latch 144 is applied to the level shifter 146, which permits independent selection of the input and output signal swings over a predetermined voltage range, and the BCD word is then applied to the input of the BCD to 7- segment decoder 148.

A square wave signal DF is applied to each of the display drivers, which frequency is in the range of 30 Hz. to 3 KHz., above the flicker rate and below the upper limit of the frequency response of the field effect liquid crystal, respectively. The development of the square wave signal DF will be hereinafter described.

The decoder 148 decodes each BCD input word to provide a corresponding display notation. For example, if the input word is 0000, the six output lines of the decoder which correspond to segments $a$ through $F$ will be 180° out of phase with signal DF and the output line corresponding to segment $g$ will be in phase with signal DF to display the number 0. A truth table for decoder 148 is shown on page 271 of RCA's Solid State Databook Series, Book SSD203C, 1975 edition. The output of the decoder 148 is connected to the display 40 via the display driver 150.

As hereinbefore stated, the power supply 110 may be a simple, low cost Zener diode supply, despite the addition of the read-only memory 130, by intermittently activating the read-only memory 130. The ratio of on to off time is selected to reduce the average power consumption of the read-only memory 130 to a magnitude which may be easily handled by the Zener diode power supply 110. The frequency of the power supply pulses which are applied to the read-only memory 130 is selected to be high enough that the display notation rapidly changes without a noticeable delay following a change in the advanced car position. For purposes of example, the ratio of on to off time was selected to be 1:64, with the read-only memory being pulsed every 3.84 milliseconds.

The pulsing of the read-only memory is performed by a switching circuit 150, with the timing for the switching circuit 150 being developed by a 32 KHz. oscillator 152 and a 7-stage binary counter 154. The 32 KHz. oscillator is preferably a COS/MOS circuit, which may be constructed using NAND gates, inverter gates or NOR gates. For example, RCA's CD4001 may be used to provide the COS/MOS devices, and they may be connected as shown on page 531 of RCA's Solid State Databook Series, Book SSD-203C, 1975 edition.

Figure 5:
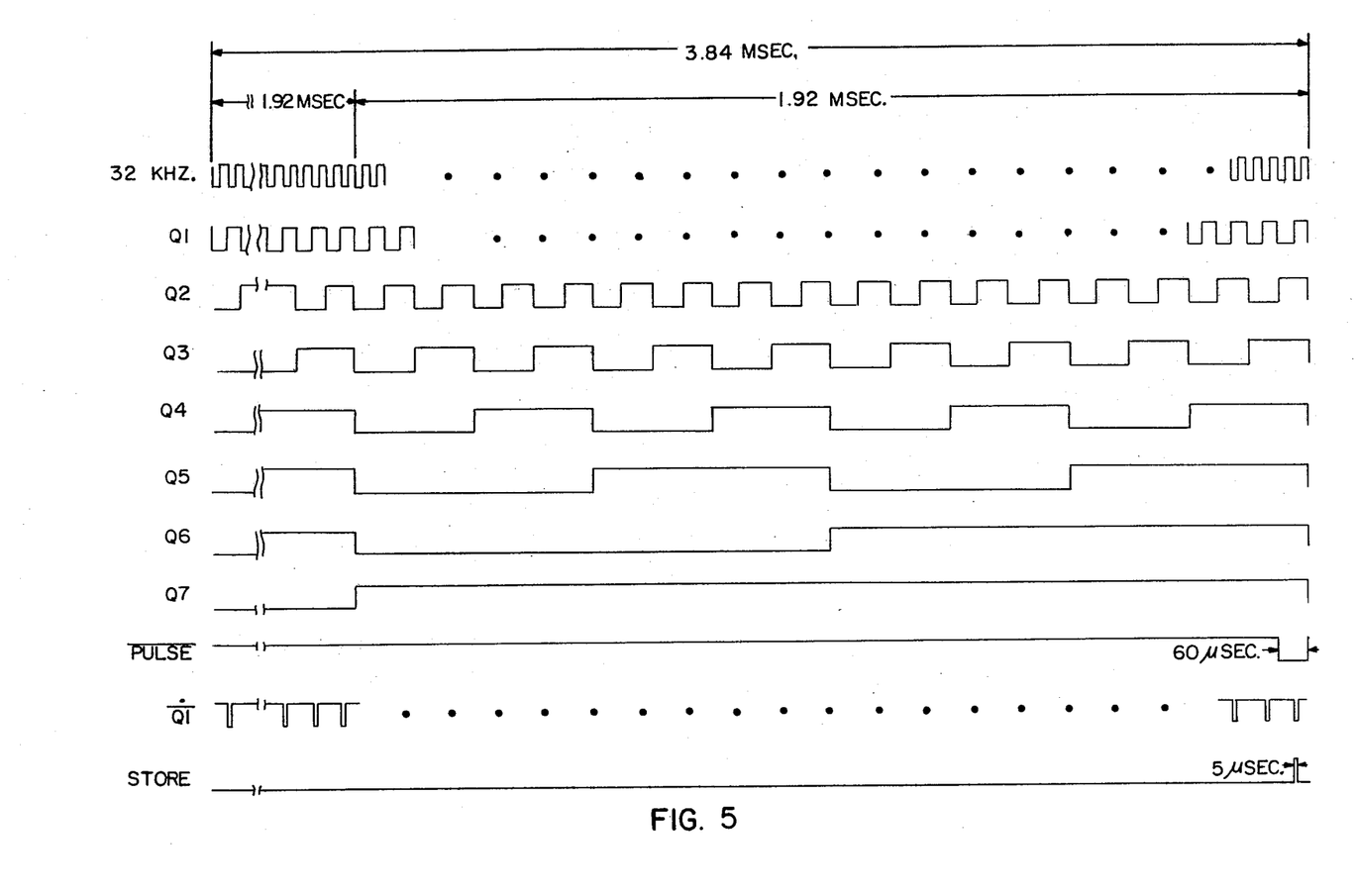
FIG. 5 is a timing diagram which illustrates the development of certain timing and control signals used in the elevator system shown in FIG. 2.

The 7-stage counter is preferably a COS/MOS 7-stage binary counter, such as RCA's CD4024. Output Q7 of the counter 154 is used to provide the square wave signal DF for the display drivers 132, 140 and 142. Outputs Q2 through Q7 are applied to a 6 input NAND gate 156 which is preferably a COS/MOS device, such as RCA's multi-function 8-input gate CD4048. Two of the inputs of this device would be tied to the +5 volt supply, and its function inputs would be set to provide the NAND function. The output of NAND gate 156, which provides a signal PULSE, will be high until all six inputs from stages Q2 through Q7 of the counter 154 are simultaneously at the logic one level. When this occurs, the output is driven low which provides a low or true signal PULSE. FIG. 5 is a timing diagram which illustrates the waveforms of the 32 KHz. oscillator 152, the output stages Q1 through Q7 of the counter 154, the output of NAND gate 156, and certain signals developed from the output of the counter 156. As illustrated in FIG. 5, the outputs of the counter stages Q2 through Q7 are simultaneously at the logic one level for 60 microseconds out of every 3.84 milliseconds, providing a low signal PULSE for 60 microseconds.

The signal PULSE is applied to the switching circuit 150 which includes PNP transistors 160 and 162, and resistors 164, 166, 168, 170 and 172. The signal PULSE is connected to the base of transistor 160 via resistor 164, and the base is also connected to the +5 volt supply provided by power supply 110 via resistor 166. The emitter of transistor 160 is connected to the +5 volt supply via serially connected resistors 168 and 170, and the junction between resistors 168 and 170 is connected to the base of transistor 162. The collector of transistor 160 is connected to logic ground via resistor 172. The emitter of transistor 162 is connected to the +5 volt supply, and the collector of transistor 162 is connected to the power supply input of the read-only memory 130. Thus, when signal PULSE goes low, transistor 160 is switched to its conductive state, the base of transistor 162 is driven more negative than its emitter, and transistor 162 is also switched to its conductive state, connecting the +5 volt power supply to the read-only memory 130, and read-only memory 130 provides an output at its 8 outputs according to the specific binary input signal and the programming of the memory in response to this input signal. The signal STORE is driven high during the low state of the signal PULSE to latch or store the output words provided by memory 130 during the time it is active.

The signal STORE is generated by inverting the output stage Q1 of counter 154 by passing it through an inverter gate 180, differentiating the output of gate 180 in a differentiating circuit 182, applying the differentiated signal to one input of a 2 input NOR gate 184, and applying the signal PULSE to the remaining input of NOR gate 184. As illustrated in FIG. 5, the differentiation of Q1 provides a 5 microsecond pulse at the midpoint of each half cycle of stage Q2. Thus, when the signal PULSE and Q1 both go to logic zero simultaneously, NOR gate 184 provides a true signal STORE for 5 microseconds, which occurs at the midpoint of the 60 microsecond signal PULSE. The true signal STORE strobes the latches 144 of the decoder/driver circuits 140 and 142 to store the two binary words provided by memory 130.

In summary, there has been disclosed a new and improved elevator system having a car position indicator which simplifies and standardizes the field wiring thereof by using a programmable read-only memory to convert the binary representation of the advanced floor position of the car to two 4-bit BCD words which may be used to drive two digits of a liquid crystal display. The logic is preferably COS/MOS and the liquid crystal display is preferably of the field effect type which enables a simple, low cost Zener diode/resistor power supply to be used in the elevator car, which is connected to the +125 volt supply available in the car. The read-only memory is made compatible with the Zener diode/resistor power supply by operating the read-only memory intermittently to greatly reduce average power consumption of the device. Latches are strobed when the memory is activated to preserve the output thereof until the next power supply pulse is applied to the read-only memory.

While the car position indicator has been described and illustrated with an elevator system of the traction type, it is to be understood that it may be utilized with any elevator system, such as an elevator system of the hydraulic type. Also, while the car position indicator has been described as being located within the elevator car, it is also to be understood that the invention applies to car position indicators, regardless of their location.

We claim as our invention:

1. Position indicator apparatus for an elevator system having an elevator car mounted for movement in a building having a plurality of floors, comprising:
    means providing a binary signal indicative of the position of the elevator car relative to the floors of the building,
    memory means,
    power supply means activating said memory means,
    display means,
    said memory means providing output signals for said display means responsive to said binary signal, with said output signals being indicative of the desired display notation for each different binary signal, enabling different display notations in different buildings responsive to the same binary signal while using identical external connections between said memory means and said means providing the binary signal, and between the memory means and said display means.

2. The position indicator apparatus of claim 1 wherein the memory means is a read-only memory which is programmed for each building.

3. The position indicator apparatus of claim 1 wherein the display includes left and right digits and the output signals provided by the memory means in response to each binary signal include first and second signals for indicating the desired notation for the left and right digits, respectively, of the display means.

4. The position indicator apparatus of claim 1 wherein the power supply means intermittently activates the memory means to reduce average power consumption, compared with continuous activation, and including latch means connected between the memory means and the display means for storing the output signals provided by the memory means, each time the memory means is activated, with the display means being responsive to the stored output signals.

5. The position indicator apparatus of claim 1 wherein the power supply means includes first power supply means providing a first unidirectional potential which is of higher magnitude than required by the memory means, second power supply means connected to the first power supply means for providing a second unidirectional potential of the magnitude required by the memory means, and means for intermittently applying said second unidirectional potential to the memory means to reduce its average power consumption.

6. The position indicator apparatus of claim 5 wherein the first power supply means is located external to the elevator car, the second power supply means, the memory means, and the display means are carried by the elevator car, and including traveling cable means interconnecting the first and second power supply means.

7. The position indicator apparatus of claim 1 wherein the memory means and display means are carried by the elevator car, and the power supply means includes first and second power supply means, with the first power supply means being located external to the elevator car, said first power supply means providing a first unidirectional potential which is of higher magnitude than required by the memory means, and with the second power supply means being carried by the elevator car, traveling cable means interconnecting said first and second power supply means, said second power supply means including a Zener diode and resistor selected to provide a second unidirectional potential of the magnitude required by the memory means, and means for intermittently applying the second unidirectional potential to the memory means, to reduce the average power consumed by the memory means and reduce the power dissipated in said resistor.

8. The position indicator apparatus of claim 7 including latch means connected between the memory means and the display means for storing the output signals provided by the memory means each time the memory means is activated, with the display means being responsive to the stored output signals.

9. The position indicator apparatus of claim 5 wherein the means intermittently applying the second unidirectional potential to the memory means includes switching means interconnecting the second unidirectional potential and the memory means, an oscillator, a multi-stage counter, and logic means connected to at least certain of the outputs of the multi-stage counter for providing a signal for operating the switching means.

10. The position indicator apparatus of claim 9 wherein the display requires a voltage which changes between two different magnitudes, with one of the outputs of the multi-stage counter being connected to provide this voltage.

11. The position indicator apparatus of claim 9 including latch means for storing the output signals of the memory means when the second unidirectional potential is applied thereto, and logic means connected to the output of at least certain of the stages of the multi-stage counter for providing a timely strobe for said latch means.

12. An elevator system for a building having a plurality of floors, comprising:
an elevator car mounted for movement in the building to serve the floors therein,
car position means carried by said elevator car operated by electrical power,
a source of electrical potential remote from the elevator car providing a first voltage,
power supply means carried by the elevator car,
traveling cable means interconnecting said source of electrical potential and said power supply means,
said power supply means providing a second voltage, lower in magnitude than said first voltage,
and means intermittently applying said second voltage to said car position means, to reduce the average power said power supply means is required to provide for said car position means.

13. The elevator system of claim 12 wherein the power supply means includes a Zener diode and a resistor.

14. The elevator system of claim 12 including means providing a binary signal responsive to the position of the elevator car relative to the floors, memory means responsive to the binary signal and to the intermittently applied second voltage for intermittently providing output signals usable by the car position means, and latch means for storing the latest output signals provided by the memory means, with the car position means displaying a floor position responsive to the signals stored in said latch means.

15. The elevator system of claim 14 wherein the memory means is a read-only memory programmed for each building to provide the desired display notation in response to each binary car position signal.

16. The elevator system of claim 12 wherein the car position means includes a visual display constructed of field effect liquid crystals.

17. The elevator system of claim 12 wherein the car position means includes a field effect liquid crystal display, COS/MOS driver means for the field effect liquid crystal display and memory means, and wherein the power supply means includes a Zener diode and a resistor, with said power supply means being intermittently applied to said memory means and continuously applied to said field effect liquid crystal display and to said COS/MOS driver means.

* * * * *